United States Patent
Jammalamadaka et al.

(10) Patent No.: US 7,322,646 B2
(45) Date of Patent: Jan. 29, 2008

(54) FOLDING HEAD RESTRAINT MECHANISM

(75) Inventors: Sai Prasad Jammalamadaka, Novi, MI (US); James C. Dalian, Pinckney, MI (US)

(73) Assignee: Lear Corporation, Southfield, MI (US)

(*) Notice: Subject to any disclaimer, the term of this patent is extended or adjusted under 35 U.S.C. 154(b) by 110 days.

(21) Appl. No.: 11/265,569

(22) Filed: Nov. 2, 2005

(65) Prior Publication Data

US 2007/0096515 A1    May 3, 2007

(51) Int. Cl.
*B60N 2/42*    (2006.01)
(52) U.S. Cl. .................... 297/216.12; 297/408
(58) Field of Classification Search ............ 297/408, 297/403, 216.12
See application file for complete search history.

(56) References Cited

U.S. PATENT DOCUMENTS

| | | | |
|---|---|---|---|
| 3,065,029 A | 11/1962 | Spound et al. | |
| 3,174,799 A | 3/1965 | Haltenberger | |
| 4,350,389 A | 9/1982 | Parsson et al. | |
| 4,623,166 A | 11/1986 | Andres et al. | |
| 4,657,297 A | 4/1987 | Ishibashi | |
| 4,923,250 A | 5/1990 | Hattori | |
| 5,145,233 A | 9/1992 | Nagashiima | |
| 5,181,758 A | 1/1993 | Sandyik | |
| 5,346,277 A | 9/1994 | Holobaugh | |
| 5,466,043 A | 11/1995 | Lambert et al. | |
| 5,520,435 A | 5/1996 | Fujimoto | |
| 5,669,668 A * | 9/1997 | Leuchtmann | 297/408 |
| 5,681,077 A | 10/1997 | Hashimoto | |
| 5,681,079 A | 10/1997 | Robinson | |
| 5,695,251 A | 12/1997 | Scolari | |
| 5,738,411 A | 4/1998 | Sutton et al. | |
| 5,748,473 A | 5/1998 | Breed et al. | |
| 5,823,619 A | 10/1998 | Heilig et al. | |
| 5,975,637 A | 11/1999 | Geuss et al. | |
| 5,984,397 A | 11/1999 | Dawson et al. | |
| 6,045,181 A * | 4/2000 | Ikeda et al. | 297/216.12 |
| 6,050,633 A | 4/2000 | Droual | |
| 6,074,011 A * | 6/2000 | Ptak et al. | 297/408 |
| 6,129,421 A * | 10/2000 | Gilson et al. | 297/408 |
| 6,192,565 B1 | 2/2001 | Tame | |
| 6,213,549 B1 | 4/2001 | Wieclawski | |
| 6,270,161 B1 | 8/2001 | De Filippo | |
| 6,273,511 B1 | 8/2001 | Wieclawski | |
| 6,390,538 B1 * | 5/2002 | Hashimoto et al. | 296/187.05 |
| 6,416,125 B1 | 7/2002 | Shah et al. | |
| 6,450,579 B1 | 9/2002 | Nylander et al. | |
| 6,478,373 B1 | 11/2002 | Hake et al. | |
| 6,485,096 B1 | 11/2002 | Azar et al. | |
| 6,550,856 B1 | 4/2003 | Ganser et al. | |
| 6,604,788 B1 | 8/2003 | Humer | |
| 6,612,653 B2 | 9/2003 | Takata | |
| 6,631,949 B2 | 10/2003 | Humer et al. | |
| 6,631,955 B2 | 10/2003 | Humer et al. | |
| 6,655,733 B2 | 12/2003 | Humer et al. | |
| 6,663,181 B2 | 12/2003 | Nygren | |

(Continued)

*Primary Examiner*—Sarah B McPartlin
(74) *Attorney, Agent, or Firm*—Brooks Kushman P.C.

(57) ABSTRACT

A vehicle seat assembly includes a seat bottom attached to a seat back with a moveable head restraint attached to the seat back. Characteristically, the head restraint is movable from a raised to a lowered position and vice versa. The head restraint of this embodiment when in the raised position is able to withstand impacts that meet or exceed the specifications of Federal Motor Vehicle Safety Standard ("FMVSS") 201.

20 Claims, 4 Drawing Sheets

U.S. PATENT DOCUMENTS

| | | |
|---|---|---|
| 6,709,051 B2 | 3/2004 | Schambre et al. |
| 6,746,154 B2 * | 6/2004 | Greene et al. ............... 384/276 |
| 6,796,613 B2 | 9/2004 | Klink et al. |
| 6,860,564 B2 | 3/2005 | Reed |
| 6,779,839 B2 | 8/2005 | Andreasson et al. |
| 6,935,696 B2 * | 8/2005 | Gauthier et al. ............ 297/408 |
| 7,044,555 B2 * | 5/2006 | Saberan ....................... 297/408 |
| 2002/0013686 A1 * | 1/2002 | Bellora et al. .................. 703/8 |
| 2002/0017797 A1 | 2/2002 | jach et al. |
| 2002/0079723 A1 | 6/2002 | Risch |
| 2003/0006637 A1 | 1/2003 | Jach et al. |
| 2003/0098596 A1 | 5/2003 | Andreasson et al. |
| 2003/0122410 A1 | 7/2003 | Fischer et al. |
| 2003/0193205 A1 | 10/2003 | Jach et al. |
| 2004/0026964 A1 | 2/2004 | Edrich |
| 2004/0119324 A1 | 6/2004 | Humer et al. |
| 2005/0001463 A1 | 1/2005 | Yetukuri et al. |
| 2005/0045071 A1 | 3/2005 | Lindstrom et al. |
| 2005/0067874 A1 * | 3/2005 | Kamrath et al. ............ 297/408 |
| 2005/0093349 A1 | 5/2005 | Low et al. |
| 2005/0121955 A1 | 6/2005 | Dudash et al. |
| 2005/0242640 A1 * | 11/2005 | Barko et al. ................. 297/238 |
| 2005/0248198 A1 | 11/2005 | Fowler et al. |
| 2005/0253429 A1 | 11/2005 | Veine et al. |
| 2005/0264053 A1 | 12/2005 | Saberan et al. |
| 2005/0264078 A1 | 12/2005 | Saberan |
| 2006/0001308 A1 | 1/2006 | Humer et al. |
| 2006/0220433 A1 * | 10/2006 | Yetukuri et al. ............ 297/408 |

* cited by examiner

FOLDING HEAD RESTRAINT MECHANISM

CROSS-REFERENCE TO RELATED APPLICATIONS

This application is related to U.S. patent application Ser. No. 10/907,503 filed Apr. 4, 2005, the entire disclosure of which is hereby incorporated by reference.

BACKGROUND OF THE INVENTION

1. Field of the Invention

The invention relates to a seat assembly having a moveable head restraint body.

2. Background Art

A seat assembly may include a head restraint cushion pivotally attached to a seat back such that the head restraint cushion is moveable between a raised position and a lowered position. The head restraint cushion may be pivoted to the lowered position by pulling on a strap extending from the head restraint cushion.

In another known rear seat assembly, an electronic mechanism is provided for pivoting a head restraint cushion with respect to a seat back. This assembly further includes a push button disposed between two front seat assemblies, or on an overhead console, for activating the electronic mechanism.

Government regulations such as Federal Motor Vehicle Safety Standard ("FMVSS") 201 provide specifications for the impact and abusive loads that some prior art vehicle seats have not been able to meet. Moreover, existing head restraints often use nylon bearings which are not sufficiently durable and robust.

Accordingly, there exists a need for improved head restraint designs that are able to withstand the impact loads detailed in FMVSS201.

SUMMARY OF THE INVENTION

Against this prior art background, the present invention provides a vehicle seat assembly that is disposable in a vehicle. The vehicle seat assembly of this embodiment includes a seat bottom attached to a seat back. The vehicle seat assembly further includes a head restraint attached to the seat back. Characteristically, the head restraint is movable from a raised to a lowered position and vice versa. Advantageously, the head restraint of this embodiment when in the raised position is able to withstand impacts that meet or exceed the specifications of FMVSS201. This capacity of the present invention is obtained by specific design of a lock angle and lock distance defined by the geometry of a lock lever.

DETAILED DESCRIPTION OF THE PREFERRED EMBODIMENT(S)

Reference will now be made in detail to presently preferred compositions or embodiments and methods of the invention, which constitute the best modes of practicing the invention presently known to the inventors.

Figure 1:
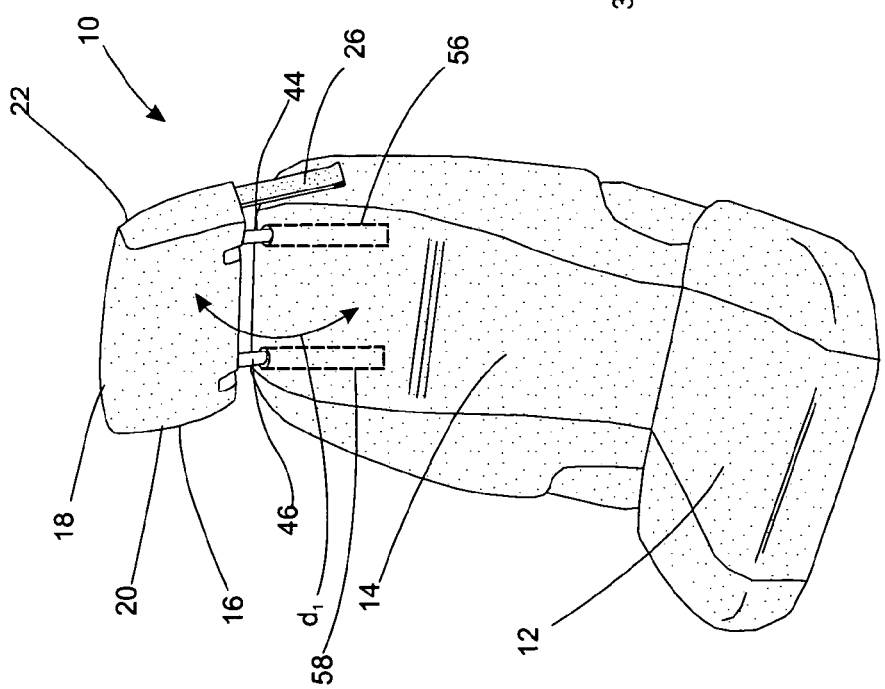
FIG. 1 is a perspective view of an embodiment of the vehicle seat assembly of the invention.

With reference to FIG. 1, a perspective view of an embodiment of the vehicle seat assembly of the invention is provided. The vehicle seat assembly is disposable in a motor vehicle. Although the seat assembly may be used for any seat in a vehicle, positioning rearward of a forward seat is particularly useful. For example, the vehicle seat assembly of this embodiment can be position at a passenger seat, at a second row of seats, at a third row of seats, and the like. The head restraint (i.e., the headrest) of vehicle seat assembly 10 is advantageously foldable into a lowered position to improve visibility for the driver (or passenger) or to facilitate folding of the entire seat. Vehicle seat assembly 10 includes seat bottom 12 which is attached to seat back 14. Seat bottom 12 includes a seat bottom frame and a cushion supported by the seat bottom frame. Similarly, seat back 14 and the seat back includes a seat back frame and a cushion mounter thereon. Vehicle seat assembly 10 further includes head restraint 16 attached to seat back 14. Head restraint 16 includes head restraint body 18 which includes a number of structures set forth below. Head restraint body 18 also includes front side 20 and back side 22. Head restraint body 18 is movable along direction $d_1$ to allow positioning in either a raised or lowered position. Vehicle seat assembly 10 includes actuator 24 for moving the vehicle seat assembly from the raised to lowered position. In one variation, actuator 24 includes strap 26. In this variation, strap 26 allows positioning of the head restraint from the raised to the lowered position. A vehicle occupant merely pulls on strap 26 when head restraint 16 is in the raised position. In other variations, actuator 24 includes a knob or push button as set forth in co-pending U.S. patent application Ser. No. 10/907,503 filed Apr. 4, 2005, the entire disclosure of which is hereby incorporated by reference. In other variations, actuator 24 is accessible by an occupant of the front seat when the seat assembly is installed in the vehicle.

Figure 2:
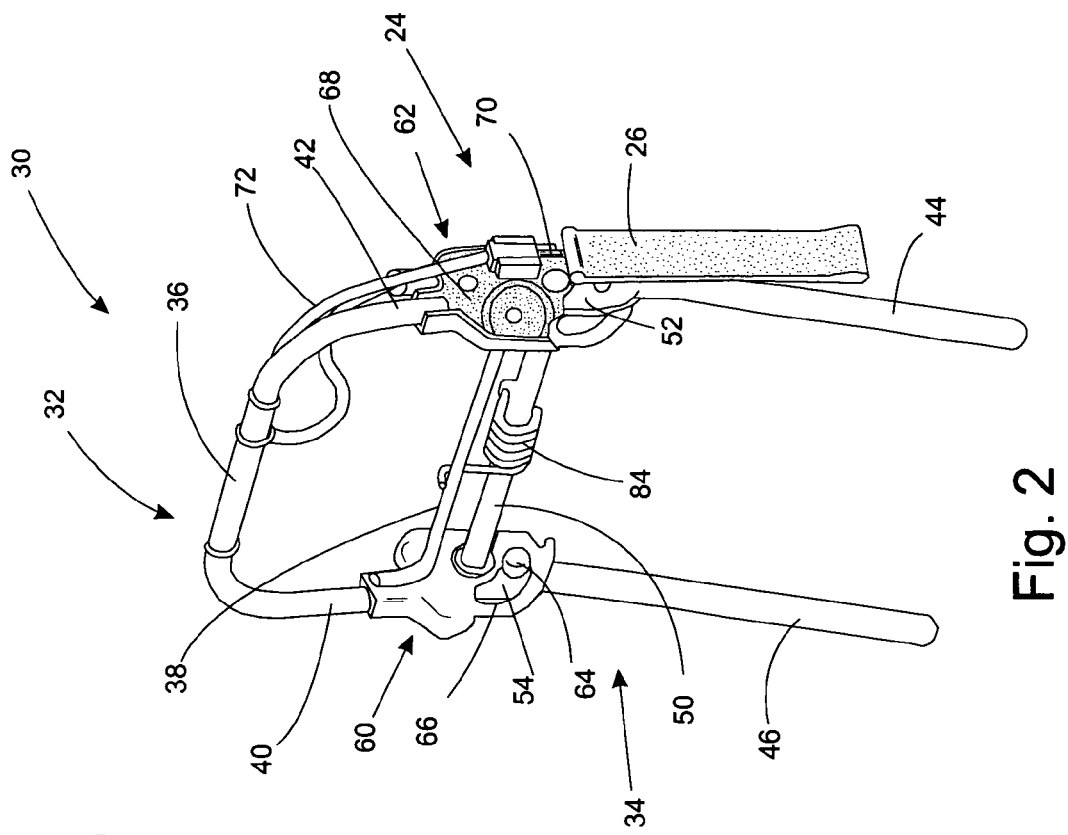
FIG. 2 is a perspective view of a frame assembly included in head restraint 16.

With reference to FIG. 2, a perspective view of a frame assembly included in head restraint 16 is provided. Head restraint 16 further includes frame assembly 30. Frame assembly 30 includes moveable upper head restraint frame assembly 32 and lower frame assembly 34. Head rest body 18 includes upper head restraint frame assembly 32. Upper head restraint frame assembly 32 includes outer head restraint frame 36. First pivot shaft 38 is in rigid communication with sides 40, 42 of outer head restraint frame 36. As used herein "rigid communication" means that either the part is directly attached to another part or indirectly attached. "Indirectly attached" means that one or more intermediate parts are interposed and attached in succession between the parts in rigid communication. Lower frame assembly 34 includes head rest posts 44, 46 that attach to seat back 14. In a variation, head rest posts 44, 46 are moveably attached to seat back 14. Head rest posts 44, 46 are in rigid communication with second pivot shaft 50 at upper sections 52, 54. Optionally, the seat back includes longitudinal track guides 56, 58 adapted to receive head rest post 44, 46 such that the head restraint is moveably attached to the track (see FIG. 1). As set forth above, head restraint body 18 is moveable from a raised position to a lowered position. During such movement, there is concurrent movement first pivot shaft 38 about second shaft 50. Frame assembly 30 also includes first pivot bracket assembly 60 and second bracket pivot assembly. The motion of head restraint body 18 is moveable from a raised position to a lowered position and is at least partially guided by movement of guide pin 64 in banana slot 66. A similar guiding mechanism is described below regarding second pivot bracket assembly 62. Second bracket assembly 62 is partially covered by face plate 68. Strap 26 is attached to cable 70 which is moveable within casing 72.

Figure 3:
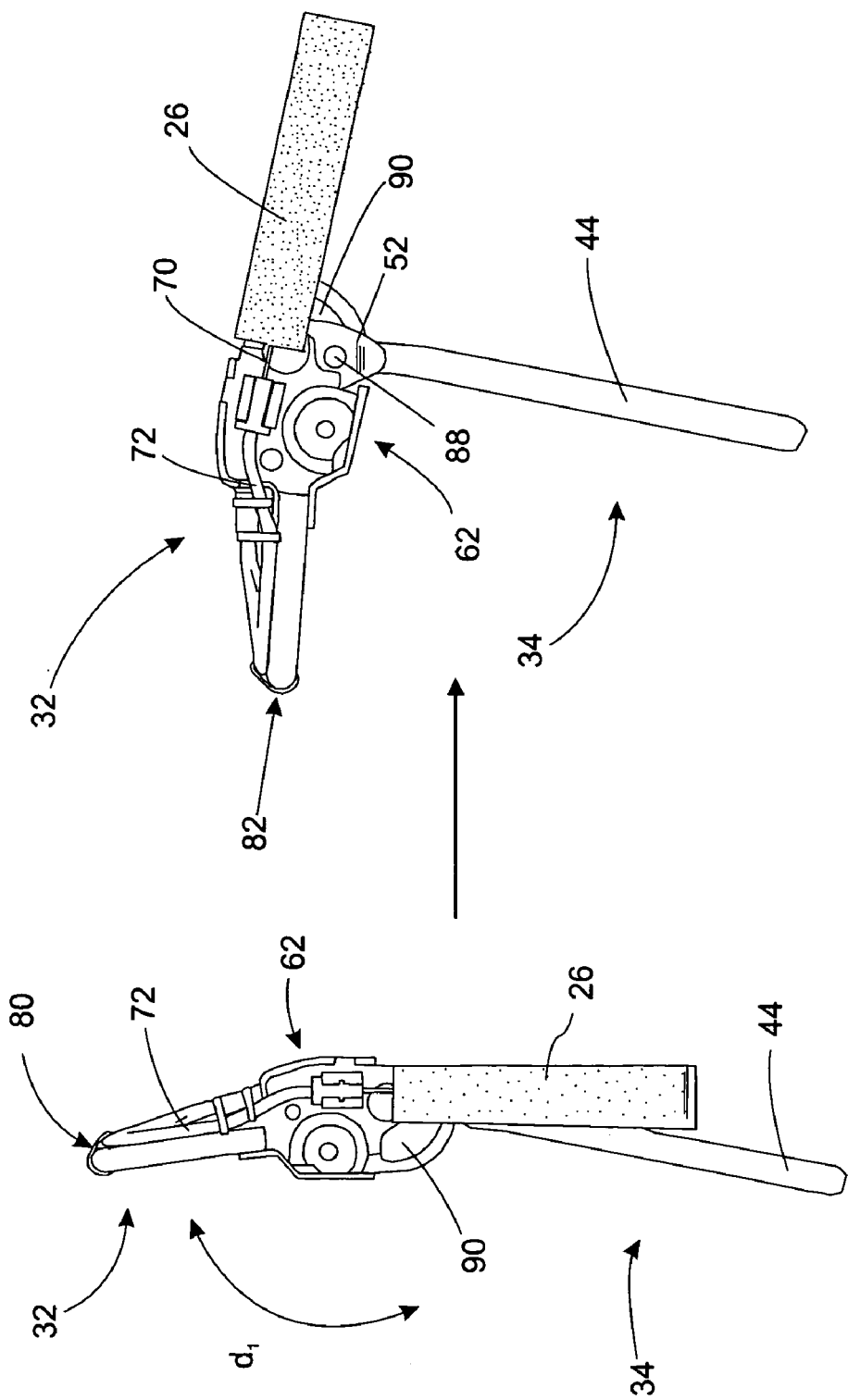
FIG. 3 is a side view illustrating motion of the head restraint frame assembly 30 from raised position 80 to lowered position 82.

With reference to FIGS. 2 and 3, the movement from the raised position to the lowered position is explained. FIG. 3 is a side view illustrating motion of the head restraint frame assembly 30 from raised position 80 to lowered position 82. When strap 26 is pulled downward, cable 70 also moves downward thereby releasing a lever (see below) such that dump spring 84 pushes on first pivot shaft 38 thereby forcing upper head restraint frame assembly 32 downward to lowered position 82 along direction $d_i$. As set forth above, motion of head restraint body 18 is moveable from a raised position to a lowered position and is at least partially guided by movement of guide pin 64 in banana slot 66. Similarly, this motion is also at least partially guided by movement of guide pin 88 (back side shown) within banana slot 90.

Figure 4:
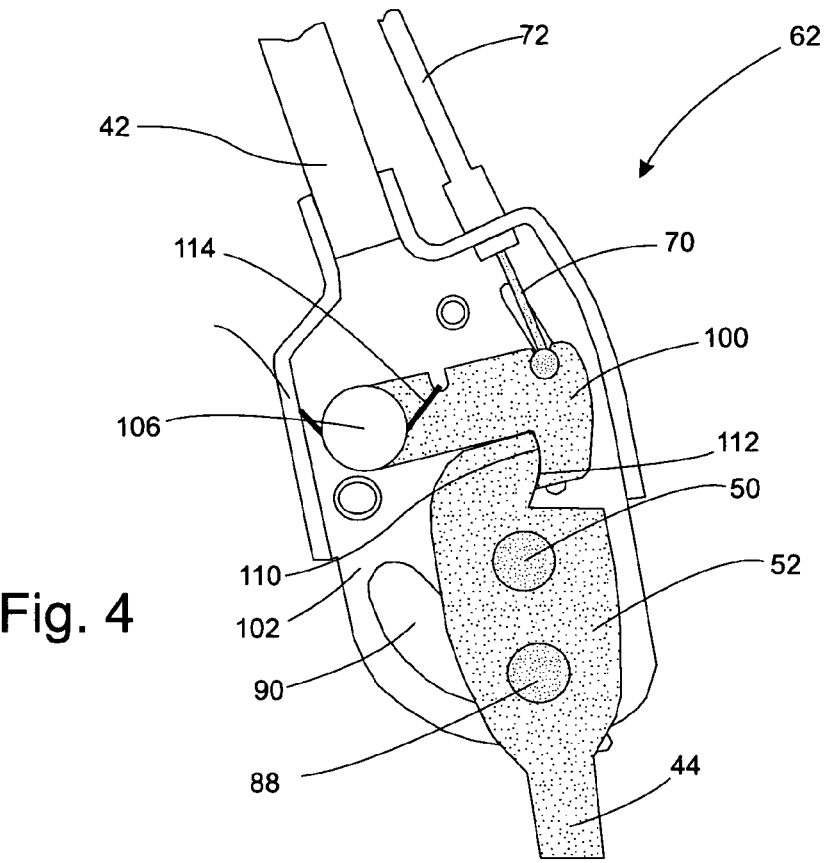
FIG. 4 is a side view of a bracket assembly with its face plate removed to reveal the interior components.
Figure 5:
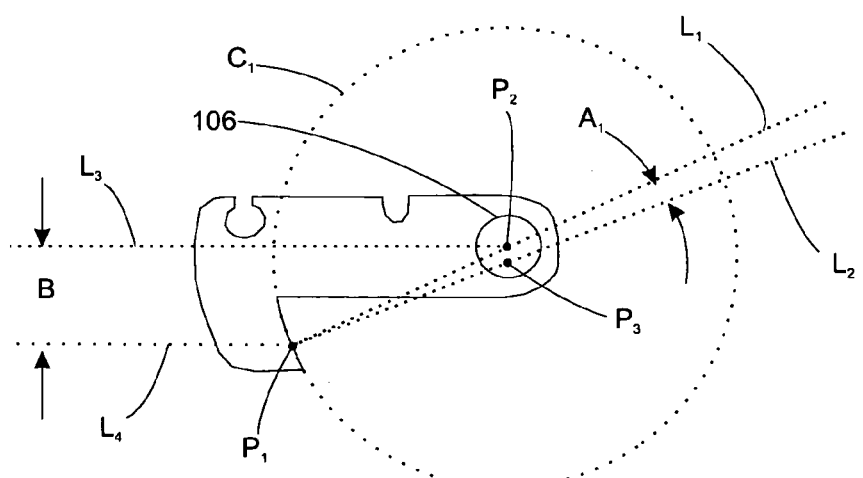
FIG. 5 is a side view of a lock lever showing the structures defining the lock angle and the lock distance.

With reference to FIGS. 4 and 5, illustrations of second pivot bracket assembly 62 and lock lever 100 are provided. FIG. 4 is a side view of second bracket assembly 62 with face plate 68 removed to reveal the interior components. FIG. 5 is a side view of lock lever 100 showing the structures defining the lock angle and the lock distance. Actuator 24 includes second pivot bracket assembly 62 which in turn includes bracket 102 upon which lock lever 100 is mounted. Lock lever 100 is pivotable about a pivot region (e.g., locking pin 106). Lock lever 100 engages upper section 52 of head rest post 44. Specifically, first locking face 110 of upper section 52 contacts second locking face 112 of lock lever 100 when head restraint body 18 is moved from the lowered to the raised position. First locking face 110 in communication with seat back 14 since head posts 44, 46 contact set back 14. Spring 114 provides force that pivots lock lever 100 towards upper section 52. Accordingly, lock lever 100 is locked in place when head restraint body 18 is in the raised position. When strap 26 is pulled, cable 70 is pulled upward thereby disengaging lock lever 100 from upper section 52. Upper head restraint frame assembly 32 then moves to the lowered position under the force of spring 84. Lock lever 100 is in communication with first pivot shaft 38 (not necessarily rigid though) in that lock lever 100 moves when first pivot shaft 38 moves. However, lock lever 100 is also pivotable about locking pin 106. The present embodiment of the invention advantageously provides useful values for the lock angle and lock distance. The lock angle and lock distance are defined with reference to FIG. 5. Point $P_1$ is a point on second locking face 112, $P_2$ is the center point of locking pin 106, and $P_3$ is the center point of circle $C_1$ which includes the arc of second locking surface 112. If the arc of surface is not exactly part of a circle, a circle approximating the arc is used for circle $C_1$. Such an approximation is provided by a least squares approximation method. Lock $A_1$ is defined as the angle between lines $L_1$ and $L_2$. Line $L_1$ is a line passing through points $P_1$ and $P_2$ and line $L_2$ is the line passing between points $P_1$ and $P_3$. The locking point distance B is defined as the difference in height between $P_1$ and $P_2$ (i.e., the distance between a horizontal line $L_3$ passing through $P_2$ and a horizontal line $L_4$ passing through $P_1$). In the present invention, the locking angle $A_1$ is such that a when vehicle seat assembly is in the raised position, the impact of a ball having a mass of about 6.8 kg moving and a diameter of about 165 mm at a speed of about 15 mile per hour on back side 22 of head restraint body 18 does not cause head restraint body 18 to move out of the raised position (i.e., it persists in the raised position and does not move to the lowered position.) Values of $A_1$ less than or equal to 7 degrees are useful. In particular, $A_1$ is from about 2 to about 7 degrees. Useful values of lock point distance are from about 6 mm to about 14 mm.

Figure 6:
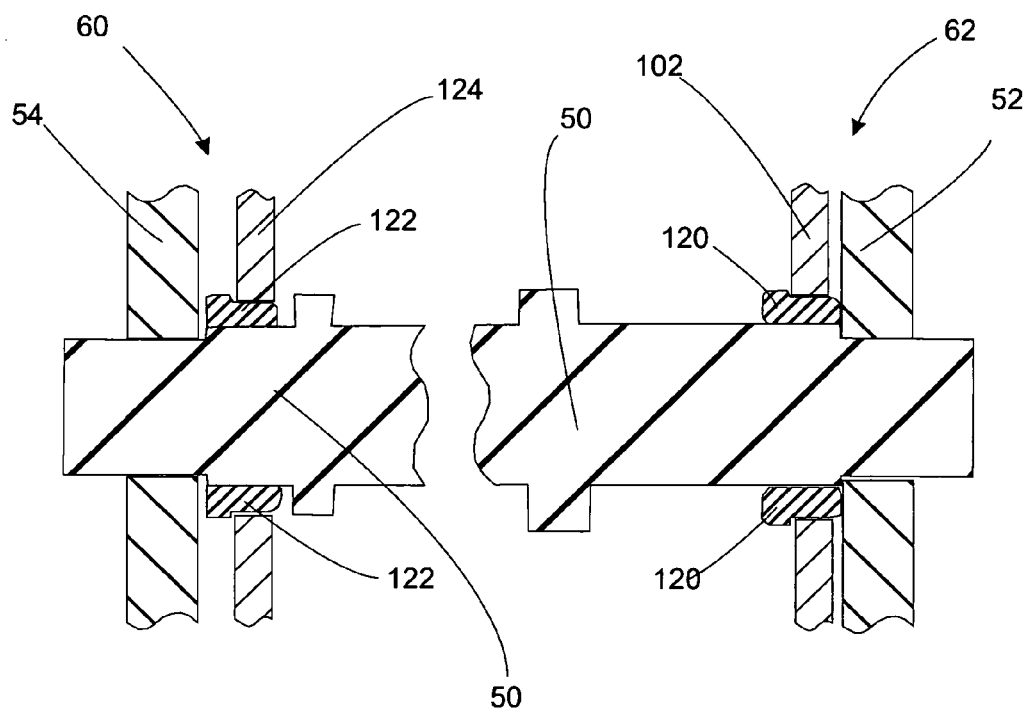
FIG. 6 is a cross-section view of showing placement of the powder metal bearings about a pivot shaft.

With reference to FIG. 6, a cross-sectional view showing placement of the powder metal bearings about second pivot shaft 50 is provided. Powder metal bearings 120, 122 are mounted about second pivot shaft 50. Moreover, powder metal bearing 120 contacts bracket 102 of second bracket assembly 62 and powder bearing 122 contacts bracket 124 of first bracket assembly 60. Use of powder metal bearing have been found particularly useful and durable in the present invention being able to withstand the repetitive movement from the raised to lower positions. Powder metal bearings are ring structures formed from sintered metals such as brass. In variations, fluid lubricants such as Fomblin oils are used. The powdered metal bearings of the invention are able to withstand abusive loads up to about 300 lbs.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A vehicle seat assembly disposable in a vehicle, the seat assembly comprising:
    a seat bottom;
    a seat back attached to the seat bottom;
    a head restraint attached to the seat back including a head restraint body having a front side and a back side, a first pivot shaft, and a second pivot shaft, such that the head restraint body is moveable from a raised position to a lowered position with concurrent movement of the first shaft about the second shaft;
    a first locking face in communication with the seat back; and
    an actuator associated with the head restraint for enabling movement of the head restraint body from the raised position to the lowered position, the actuator including a lock lever in communication with the first shaft, the lock lever having a second locking face and a pivot region pivotable about a locking pin such that the first locking face contacts the second locking face when the head restraint is in the raised position thereby locking the head restraint in the raised position, wherein the pivot region and the second locking face are oriented to define a lock angle sufficient to resist movement from the raised position to the lowered position during impact upon the head restraint body from the back side with a ball having a mass of about 6.8 kg and a diameter of about 165 mm moving at a speed of about 15 miles per hour, the lock angle being the angle between a first line passing through a point on the second locking face and the center point of the locking pin and a second line passing through the point on the second locking face and the center point of a circle which includes an approximate arc of the second locking surface.

2. The seat assembly of claim 1 wherein the lock angle is from about 2 to about 7 degrees.

3. The seat assembly of claim 1 wherein the pivot region and the second locking face are oriented to define a lock point distance is from about 6 mm to about 14 mm.

4. The seat assembly of claim 1 wherein the second pivot shaft contacts a pair of powder metal bearings, the powder metal bearings allowing movement about the second pivot shaft when the head restraint body moves from the raised position to the lowered position.

5. The seat assembly of claim 4 wherein the head restraint body includes a head restraint frame and a bracket attached to the head restraint frame wherein the first pivot shaft is attached to the head restraint frame.

6. The seat assembly of claim 5 wherein the lock lever is mounted upon the bracket.

7. The seat assembly of claim 6 further comprising a dump spring in communication with the first pivot shaft and the second pivot shaft, the dump spring providing a force that acts to move the head restraint from the raised to the lowered position.

8. The seat assembly of claim 5 wherein the head restraint further comprises two head rest posts that attach to the seat back and to the second pivot shaft.

9. The seat assembly of claim 8 wherein the seat back includes a track having a longitudinal track guide adapted to receive the two head rest posts such that the head restraint is moveably attached to the track.

10. The seat assembly of claim 1 wherein the actuator is accessible by an occupant of a front seat when the seat assembly is installed in the vehicle.

11. The seat assembly of claim 1 wherein the actuator further comprises a strap such that when the head restraint body from is in the raised position, the strap allows a vehicle occupant to pull the head restraint body from the raised position to the lowered position.

12. The seat assembly of claim 1 wherein the actuator includes a knob or push button.

13. The seat assembly of claim 1 wherein the head restraint body pivots forward when the head restraint body moves from the raised position toward the lowered position.

14. The seat assembly of claim 1 wherein the seat bottom includes a seat bottom frame and a cushion supported by the seat bottom frame and the seat back includes a seat back frame and a cushion mounter thereon.

15. A vehicle seat assembly disposable in a vehicle rearward of a front seat, the seat assembly comprising:
   a seat bottom;
   a seat back attached to the seat bottom;
   a head restraint attached to the seat back including a head restraint body having a front side and a back side, a first pivot shaft, and a second pivot shaft, such that the head restraint body is moveable from a raised position to a lowered position with concurrent movement of the first shaft about the second shaft;
   a first locking face in communication with the seat back; and
   an actuator associated with the head restraint for enabling movement of the head restraint body from the raised position to the lowered position, the actuator including a lock lever in communication with the first shaft, the lock lever having a second locking face and a pivot region pivotable about a locking pin such that the first locking face contacts the second locking face when the head restraint is in the raised position thereby locking the head restraint in the raised position, wherein the pivot region and the second locking face are oriented to define a lock angle from 2 to about 7 degrees and a lock point distance is from 6 mm to about 14 mm, the lock angle being the angle between a first line passing through a point on the second locking face and the center point of the locking pin and a second line passing through the point on the second locking face and the center point of a circle which includes an approximate arc of the second locking surface and the lock point distance being the distance between a horizontal line through the center point of the locking pin and a horizontal line passing through the point on the second locking face.

16. The seat assembly of claim 15 wherein the second pivot shaft contacts a pair of powder metal bearings, the powder metal bearings allowing movement about the second pivot shaft when the head restraint body moves from the raised position to the lowered position.

17. The seat assembly of claim 16 wherein the head restraint body includes a head restraint frame and a bracket attached to the head rest frame wherein the first pivot shaft is attached to the head restraint frame, wherein the lock lever is mounted upon the bracket.

18. The seat assembly of claim 17 further comprising a dump spring in communication with the first pivot shaft and the second pivot shaft, the dump spring providing a force that acts to move the head restraint from the raised to the lowered position.

19. The seat assembly of claim 18 wherein the head restraint further comprises two head rest posts that attach to the seat back and to the second pivot shaft and wherein the seat back includes a track having a longitudinal track axis adapted to receive the two head rest posts such that the head restraint is moveably attached to the track.

20. A vehicle seat assembly disposable in a vehicle rearward of a front seat, the seat assembly comprising:
   a seat bottom;
   a seat back attached to the seat bottom;
   a head restraint attached to the seat back including a head restraint body having a front side and a back side, a first pivot shaft, and a second pivot shaft, such that the head restraint body is moveable from a raised position to a lowered position with concurrent movement of the first shaft about the second shaft, the second pivot shaft contacting a pair of powder metal bearings, the powder metal bearings allowing movement about the second pivot shaft when the head restraint body moves from the raised position to the lowered position;
   a first locking face in communication with the seat back; and an actuator associated with the head restraint for enabling movement of the head restraint body from the raised position to the lowered position, the actuator including a lock lever in communication with the first shaft, the lock lever having a second locking face and a pivot region pivotable about a locking pin such that the first locking face contacts the second locking face when the head restraint is moved from the lowered to the raised position thereby locking the head restraint in the raised position, wherein the pivot region and the second locking face are oriented to define a lock angle from 2 to about 7 degrees and a lock point distance is from 6 mm to about 14 mm the lock angle being the angle between a first line passing through a point on the second locking face and the center point of the locking pin and a second line passing through the point on the second locking face and the center point of a circle which includes an approximate arc of the second locking surface and the lock point distance being the distance between a horizontal line through the center point of the locking pin and a horizontal line passing through the point on the second locking face.

* * * * *

UNITED STATES PATENT AND TRADEMARK OFFICE
CERTIFICATE OF CORRECTION

PATENT NO. : 7,322,646 B2  Page 1 of 1
APPLICATION NO. : 11/265569
DATED : January 29, 2008
INVENTOR(S) : Jammalamadaka et al.

It is certified that error appears in the above-identified patent and that said Letters Patent is hereby corrected as shown below:

Column 5, Line 29, Claim 11:

After "body" delete "from"

Signed and Sealed this

Twenty-fourth Day of June, 2008

JON W. DUDAS
*Director of the United States Patent and Trademark Office*